(12) United States Patent
Saito et al.

(10) Patent No.: US 11,293,306 B2
(45) Date of Patent: Apr. 5, 2022

(54) EXPANSION TURBINE (71) Applicant: KAWASAKI JUKOGYO KABUSHIKI KAISHA, Kobe (JP)

(72) Inventors: Yuichi Saito, Akashi (JP); Hidetsugu Ishimaru, Kobe (JP); Ryota Takeuchi, Ikoma-gun (JP); Toshimitsu Adachi, Kobe (JP); Daisuke Kariya, Kobe (JP); Naoto Sakai, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 10 days.

(21) Appl. No.: 16/759,707

(22) PCT Filed: Oct. 10, 2018

(86) PCT No.: PCT/JP2018/037641
§ 371 (c)(1),
(2) Date: Apr. 27, 2020

(87) PCT Pub. No.: WO2019/082643
PCT Pub. Date: May 2, 2019

(65) Prior Publication Data
US 2020/0332678 A1 Oct. 22, 2020

(30) Foreign Application Priority Data
Oct. 27, 2017 (JP) .............................. JP2017-208076

(51) Int. Cl.
*F01D 25/16* (2006.01)
*F01D 25/10* (2006.01)
(Continued)

(52) U.S. Cl.
CPC .............. *F01D 25/16* (2013.01); *F01D 25/10* (2013.01); *F02C 1/02* (2013.01); *F02C 6/06* (2013.01);
(Continued)

(58) Field of Classification Search
CPC .......... F01D 25/16; F01D 25/10; F01D 25/22; F05D 2240/52; F05D 2240/55; F02C 1/02;
(Continued)

(56) References Cited

U.S. PATENT DOCUMENTS 3,105,631 A * 10/1963 Hanny .................. F16C 37/002
415/175
3,544,120 A 12/1970 Stamm
(Continued)

FOREIGN PATENT DOCUMENTS

DE 1 928 784 A1 12/1970
DE 1 938 830 A1 2/1971
(Continued)

*Primary Examiner* — Courtney D Heinle
*Assistant Examiner* — Ryan C Clark
(74) *Attorney, Agent, or Firm* — Oliff PLC (57) ABSTRACT

An expansion turbine configured such that even when pressure of process gas steeply changes, the amount of process gas leaking from a gap between an impeller and a cover is made small. The expansion turbine includes a gas supply passage which is connected to any one of a gas supply passage and a gas discharge passage and through which gas is supplied to a region located between a rotor member and a casing member.

6 Claims, 3 Drawing Sheets

(51) Int. Cl.
*F02C 1/02* (2006.01)
*F02C 6/06* (2006.01)
*F02C 7/06* (2006.01)
*F02C 7/28* (2006.01)
*F16C 32/06* (2006.01)
*F16J 15/447* (2006.01)

(52) U.S. Cl.
CPC .................. *F02C 7/06* (2013.01); *F02C 7/28* (2013.01); *F16C 32/06* (2013.01); *F16J 15/447* (2013.01); *F05D 2240/52* (2013.01); *F05D 2240/55* (2013.01)

(58) Field of Classification Search
CPC ...... F02C 6/06; F02C 7/06; F02C 7/28; F16C 32/06; F16C 32/0696; F16J 15/447
See application file for complete search history.

(56) References Cited

U.S. PATENT DOCUMENTS

| | | | |
|---|---|---|---|
| 9,644,888 B2 | 5/2017 | Ishimaru et al. | |
| 9,765,817 B1* | 9/2017 | Chen | F16C 33/1045 |
| 10,927,759 B2* | 2/2021 | Ikeya | F02C 7/06 |
| 2005/0089392 A1 | 4/2005 | Lubell et al. | |
| 2012/0306206 A1 | 12/2012 | Agrawal et al. | |
| 2017/0314419 A1* | 11/2017 | Bowan | F04D 29/061 |

FOREIGN PATENT DOCUMENTS

| | | | | |
|---|---|---|---|---|
| GB | 1040107 A | 8/1966 | | |
| JP | S63-169447 A | 7/1988 | | |
| JP | H01-121501 A | 5/1989 | | |
| JP | 2017-008775 A | 1/2017 | | |
| WO | WO-2012163138 A1 * | 12/2012 | ......... | F16C 32/0622 |
| WO | 2016/203767 A1 | 12/2016 | | |

* cited by examiner

EXPANSION TURBINE

TECHNICAL FIELD

The present invention relates to an expansion turbine supported by a static pressure gas bearing.

BACKGROUND ART

Conventionally known are cryogenic freezers configured to produce cold by performing adiabatic expansion of process gas, such as helium or hydrogen, with expansion turbines. In such expansion turbines, gas bearings that use the process gas are utilized to support rotating shafts in some cases. The gas bearings can be roughly classified into static pressure gas bearings and dynamic pressure gas bearings. The static pressure gas bearings are more advantageous than the dynamic pressure gas bearings in that: a load capacity is large; and contact between the rotating shaft and the bearing does not occur at the time of the start and stop of the expansion turbine.

When operating such expansion turbine, low-temperature process gas leaks to a bearing portion from a sealing portion provided at a back surface of an impeller in some cases. The rotating shaft and the bearing portion may be cooled by this leaking low-temperature process gas, and with this, dimensional accuracy of the rotating shaft and the bearing portion may deteriorate. If the rotating shaft rotates when the dimensional accuracy of the rotating shaft and the bearing portion has deteriorated during the operation of the expansion turbine, the rotating shaft may contact the bearing portion, and this may cause a device failure.

To reduce the amount of low-temperature process gas leaking from the sealing portion provided at the back surface of the impeller in the expansion turbine, PTL 1 discloses an expansion turbine configured such that: a seal gas chamber is provided at the back surface of the impeller; and a seal gas is supplied to the seal gas chamber. In PTL 1, an internal temperature of the seal gas chamber is detected, and the flow rate of the gas supplied to the seal gas chamber is adjusted in accordance with the internal temperature of the seal gas chamber.

CITATION LIST

Patent Literature

PTL 1: Japanese Laid-Open Patent Application Publication No. 63-169447

SUMMARY OF INVENTION

Technical Problem

However, according to the expansion turbine disclosed in PTL 1, a time lag occurs in a period from when the internal temperature of the seal gas chamber is detected until when the flow rate of the seal gas supplied to the seal gas chamber is adjusted. Therefore, the expansion turbine disclosed in PTL 1 may not be able to deal with cases, such as start-up and load change, where pressure of the process gas steeply changes, and therefore, the seal gas may not be able to be supplied to the seal gas chamber at an appropriate flow rate. On this account, the dimensional accuracy of the rotating shaft and the bearing portion may deteriorate, and this may cause a device failure.

The present invention was made under these circumstances, and an object of the present invention is to provide an expansion turbine configured such that even when the pressure of the process gas steeply changes, a decrease in temperature around the rotating shaft and the bearing portion by the leak of the low-temperature process gas from the sealing portion provided at the back surface of the impeller is made small.

Solution to Problem

An expansion turbine of the present invention includes: a rotor member including a rotating shaft and a first impeller attached to a first end of the rotating shaft and configured to, when the rotating shaft rotates, expand process gas while taking the process gas in the first impeller; and a casing member configured to accommodate the rotor member such that the rotor member is rotatable. The casing member includes a bearing portion supporting the rotating shaft, a first gas supply passage through which gas is supplied to a first region between the rotating shaft and the bearing portion, a gas discharge passage through which the gas supplied to the first region is discharged from the first region, and a second gas supply passage connected to any one of the first gas supply passage and the gas discharge passage, the gas being supplied through the second gas supply passage to a second region between the rotor member and the casing member.

Advantageous Effects of Invention

According to the expansion turbine of the present invention, even when the pressure of the process gas steeply changes, a decrease in temperature around the rotating shaft and the bearing portion by the leak of the low-temperature process gas from the sealing portion provided at the back surface of the impeller is made small. Therefore, failures can be prevented from occurring, and reliability of the expansion turbine can be improved.

DESCRIPTION OF EMBODIMENTS

Embodiment 1

Hereinafter, embodiments of the present invention will be described with reference to the attached drawings.

Figure 1:
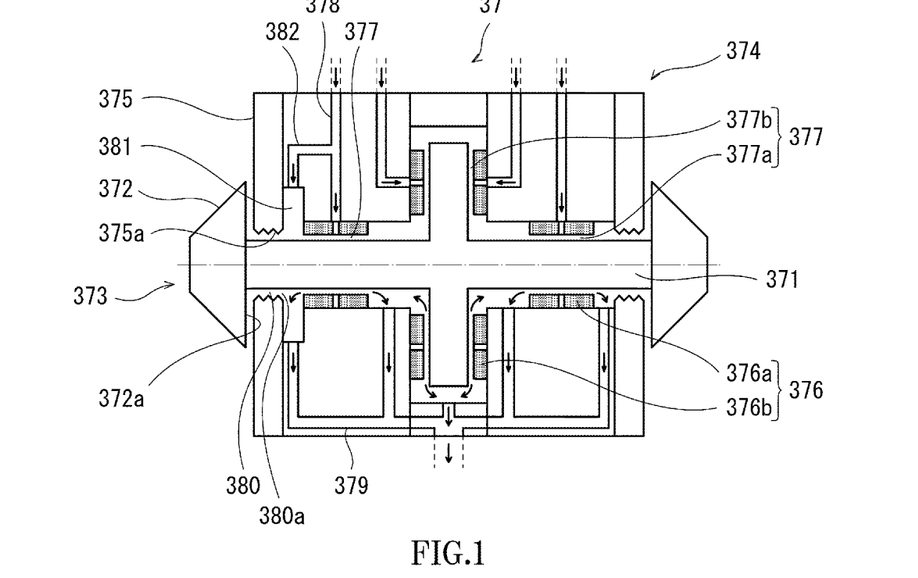
FIG. 1 is a configuration diagram showing an expansion turbine.

FIG. 1 is a configuration diagram showing an expansion turbine 37. FIG. 1 shows gas supply passages through which gas is supplied to bearing portions in the expansion turbine 37 and gas discharge passages through which bearing gas is discharged from the bearing portions in the expansion turbine 37. In the present embodiment, gas that is the same in type as process gas is used as the bearing gas.

The expansion turbine 37 includes a rotor member 373 and a casing member 374. The rotor member 373 includes a rotating shaft 371 and an impeller 372. The casing member 374 accommodates the rotor member 373 such that the rotor member 373 is rotatable.

The impeller (first impeller) 372 is attached to a first end of the rotating shaft 371. When the rotating shaft 371 rotates, the impeller 372 expands the process gas while taking the process gas into the expansion turbine 37.

The casing member 374 accommodates the rotor member 373 such that the rotor member 373 is rotatable. The casing member 374 includes a cover 375 covering the impeller 372. The cover 375 is configured to cover at least a back surface portion 372a of the impeller 372.

An insertion portion 375a through which the rotating shaft 371 of the rotor member 373 is inserted is formed at the cover 375. The rotating shaft 371 is inserted into the cover 375 through the insertion portion 375a. In this case, the rotor member 373 is arranged such that the impeller 372 projects to an outside of the cover 375. With this, the rotor member 373 is arranged in the casing member 374 so as to be rotatable.

A sealing portion is provided on an inner peripheral surface of the insertion portion 375a, and the leak of the process gas toward a second end side of the sealing portion is prevented. In the present embodiment, projections and depressions are formed on the inner peripheral surface of the insertion portion 375a. With this, a labyrinth seal is formed on the inner peripheral surface of the insertion portion 375a. Since the labyrinth seal is formed at the insertion portion 375a, the leak of the process gas, taken by the impeller 372, toward the second end side of the insertion portion 375a along the rotating shaft 371 can be made small. It should be noted that the sealing portion provided at the insertion portion 375a may be a sealing portion other than the labyrinth seal. Another sealing portion may be used as long as the leak of the process gas toward the second end side of the insertion portion 375a along the rotating shaft 371 can be made small.

Herein, the "second end side" denotes a side opposite to a side where the impeller 372 configured to expand the process gas is attached to the rotating shaft 371.

The casing member 374 includes a bearing portion 376 supporting the rotating shaft 371. The bearing portion 376 includes a radial bearing portion 376a and a thrust bearing portion 376b. The radial bearing portion 376a supports the rotating shaft 371 in a radial direction, and the thrust bearing portion 376b supports the rotating shaft 371 in an axial direction of the rotating shaft.

A gas supply passage (first gas supply passage) 378 through which the bearing gas is supplied to a region (first region) 377 between the rotating shaft 371 and the bearing portion 376 is formed at the casing member 374. Thus, the bearing gas can be supplied through the gas supply passage 378 to the region 377 between the rotating shaft 371 and the bearing portion 376.

By supplying the bearing gas to a region 377a between the rotating shaft 371 and the radial bearing portion 376a by appropriate pressure and rotating the rotating shaft 371, the rotating shaft 371 floats inside the radial bearing portion 376a. Accordingly, the position of the rotating shaft 371 in the radial direction is maintained. Therefore, a noncontact state between the rotating shaft 371 and the radial bearing portion 376a is maintained.

As above, when operating the expansion turbine 37, the rotating shaft 371 can be rotated while realizing the noncontact state between the rotating shaft 371 and the radial bearing portion 376a. Since the rotating shaft 371 rotates without contacting the radial bearing portion 376a, resistance generated when the rotating shaft 371 rotates can be made small. With this, energy consumption when operating the expansion turbine 37 can be made small.

Further, by supplying the bearing gas to a region 377b between the rotating shaft 371 and the thrust bearing portion 376b by appropriate pressure and rotating the rotating shaft 371, the rotating shaft 371 can be maintained at an appropriate position in the axial direction. Therefore, a noncontact state between the rotating shaft 371 and the thrust bearing portion 376b is maintained. As above, when operating the expansion turbine 37, the rotating shaft 371 can be rotated while realizing the noncontact state between the rotating shaft 371 and the thrust bearing portion 376b. Since the rotating shaft 371 rotates without contacting the thrust bearing portion 376b, the resistance generated when the rotating shaft 371 rotates can be made small. With this, the energy consumption when operating the expansion turbine 37 can be made further small.

The expansion turbine 37 further includes a gas discharge passage 379 through which the bearing gas supplied through the gas supply passage 378 to the region 377 between the rotating shaft 371 and the bearing portion 376 is discharged from the region 377.

Since the expansion turbine 37 is operated by rotating the rotating shaft while realizing the noncontact state between the rotating shaft and the bearing portion by the bearing gas in a gas form, lubricating oil in a liquid form can be prevented from being mixed with the process gas.

The rotor member 373 is configured to be rotatable while being accommodated in the casing member 374. Therefore, when the rotating shaft 371 rotates, a gap is necessarily formed between the rotating shaft 371 and the casing member 374. Part of the process gas expanded by the impeller 372 may flow through a gap between the back surface portion 372a of the impeller 372 and the cover 375 and a gap between the cover 375 and the rotating shaft 371 into a region located at the second end side of the cover 375.

The process gas expanded by the impeller 372 has extremely low temperature. If the process gas having the extremely low temperature flows into the region located at the second end side of the insertion portion 375a of the cover 375, the rotating shaft 371, the bearing portion 376, and their peripheral members are cooled by the process gas. If the temperatures of the rotating shaft 371 and the bearing portion 376 becomes extremely low, the rotating shaft 371 and the bearing portion 376 contract, and therefore, dimensional accuracy of the rotating shaft 371 and the bearing portion 376 deteriorates. In this state, when the expansion turbine 37 is operated, and the rotating shaft 371 rotates, the rotating shaft 371 and the bearing portion 376 may contact each other, and this may cause failures of the rotating shaft 371, the bearing portion 376, and/or their peripheral devices.

Therefore, in the present embodiment, gas (gas for heating) having normal temperature is supplied to a region between the rotor member 373 and the casing member 374. Hereinafter, the gas supplied to the region between the rotor member 373 and the casing member 374 and gas passages will be described.

In the present embodiment, a gas supply passage (second gas supply passage) 382 is formed. The gas is supplied through the gas supply passage 382 to a region 381 located close to a region (third region) 380 between the rotating shaft 371 and the insertion portion 375a, the region 381 being part of a region (second region) between the rotor member 373 and the casing member 374. In the present embodiment, the region 381 to which the gas is supplied through the gas supply passage 382 communicates with the region 380 between the rotating shaft 371 and the insertion portion 375*a*. The region 380 is formed so as to communicate with the region 381 through an end portion 380*a* of the region 380, the end portion 380*a* being located at the second end side opposite to a side (first end side) where the impeller 372 is attached.

In the present embodiment, the gas is supplied to the region 381 through the gas supply passage 382. Since the gas that is higher in temperature than the process gas expanded by the impeller 372 is supplied to the region 381, a decrease in temperature of the gas in the region 381 can be made small.

In the present embodiment, an inside of the casing member 374 is entirely filled with gas that is the same in type as the process gas. Therefore, an inside of the region 381 is also filled with the gas that is the same in type as the process gas. On this account, by supplying to the region 381 the gas that is the same in type as the process gas having high temperature, the decrease in temperature of the gas in the region 381 can be prevented. As above, a decrease in temperature around the rotating shaft 371 and the bearing portion 376 by the leak of the process gas through the gap between the impeller 372 and the cover 375 can be made small.

In the present embodiment, the region 381 to which the gas is supplied is formed at a position close to an exit for the process gas flowing out through the gap between the impeller 372 and the cover 375. Therefore, the gas for heating from the gas supply passage 382 is supplied to the position close to the exit for the process gas flowing out through the gap between the impeller 372 and the cover 375. The gas for heating is supplied to the region 381 filled with the process gas which has just flowed out from the exit. Therefore, even if the process gas leaks from the gap between the impeller 372 and the cover 375, portions cooled by the leaking process gas can be efficiently heated. Thus, the decrease in temperature of the gas in the region 381 can be efficiently prevented.

The gas supply passage 382 connected to the region 381 is branched from the gas supply passage 378 through which the bearing gas is supplied to the bearing portion 376. Then, the gas supply passage 382 extends to the region 381. Therefore, the gas supplied to the region 381 is the same as the bearing gas supplied to the bearing portion 376 to realize the noncontact state between the rotating shaft 371 and the bearing portion 376. In the present embodiment, the gas having normal temperature is supplied to the bearing portion 376 and the region 381.

Since the gas supplied to the bearing portion 376 and the region 381 has normal temperature, the gas is higher in temperature than the process gas expanded by the impeller 372. Therefore, the gas that is higher in temperature than the process gas expanded by the impeller 372 is supplied to the region 381. With this, the decrease in temperature of the region 381 by the process gas leaking into the region 381 through the gap between the back surface portion 372*a* of the impeller 372 and the cover 375 and the gap between the cover 375 and the rotating shaft 371 can be made small.

Since the decrease in temperature of the region 381 can be made small, the decrease in temperature of the rotating shaft 371 and the bearing portion 376 can be made small. Therefore, the deterioration of the dimensional accuracy of the rotating shaft 371 and the bearing portion 376 can be prevented. Since the expansion turbine 37 is operated while maintaining the noncontact state between the rotating shaft 371 and the bearing portion 376, reliability of the expansion turbine 37 can be improved.

Regarding the gas supplied to the radial bearing portion 376*a* located at the first end side where the impeller 372 is provided, part of the gas discharged from the region 377*a* between the rotating shaft 371 and the radial bearing portion 376*a* is directly supplied to the region 381. At this time, the gas flowing out from the radial bearing portion 376*a* passes through a gap between the rotating shaft 371 and the radial bearing portion 376*a* and is directly supplied to the region 381. Herein, a passage through which the gas flows is not specially formed, but the gap between the rotating shaft 371 and the radial bearing portion 376*a* serves as a gas supply passage (second gas supply passage) through which the gas is supplied to the region 381. The gas for heating the region 381 is supplied to the region 381 through the gap between the rotating shaft 371 and the radial bearing portion 376*a*.

The gas supplied to the region 381 is originally the bearing gas supplied to the region 377 between the rotating shaft 371 and the bearing portion 376. In the present embodiment, the gas supply passage 378 for the bearing gas to be supplied to the region 377 between the rotating shaft 371 and the bearing portion 376 branches to be connected to the region 381. Therefore, a special gas supply means for supplying gas for heating to the region 381 is not provided. On this account, the gas can be supplied to the region 381 by a simple configuration change. Thus, cost for improving the reliability of the expansion turbine 37 by supplying the gas to the region 381 can be made low.

Further, since part of the gas supply passage 378 through which the bearing gas is supplied to the bearing portion 376 is used as the gas supply passage 382, a configuration change when forming the gas supply passage 382 is small. Therefore, cost for forming the gas supply passage 382 through which the gas is supplied to the region 381 can be made low.

Further, the gas to be supplied to the region 381 passes through the gas supply passage 382 branched from the gas supply passage 378 through which the bearing gas is supplied to the bearing portion 376. Therefore, while the bearing gas is being supplied to the region 377 between the rotating shaft 371 and the bearing portion 376, the supply of the gas to the region 381 is also performed continuously. In the present embodiment, while the expansion turbine 37 is being operated, and the rotating shaft 371 is rotating, the gas is continuously supplied to the region 381. Therefore, the gas is continuously supplied to the region 381 at a fixed flow rate regardless of a change in pressure of the process gas expanded by the impeller 372. On this account, even when the pressure of the process gas steeply changes, the gas is supplied to the region 381. With this, even when the pressure of the process gas steeply changes, the decrease in temperature around the rotating shaft 371 and the bearing portion 376 can be prevented. Therefore, the dimensional accuracy of members around the rotating shaft 371 and the bearing portion 376 does not deteriorate, and the amount of process gas leaking through the gap between the impeller 372 and the cover 375 is made small. To be specific, even in cases, such as start-up and load change, where the pressure of the process gas steeply changes, the gas is continuously supplied to the region 381, and therefore, the decrease in temperature around the rotating shaft 371 can be prevented. Thus, the reliability of the expansion turbine 37 can be improved.

The gas supplied to the region 381 gives its heat to the gas in a space of the region 381 to heat the gas in the region 381, and then passes through the gas discharge passage 379 and is discharged to an outside of the expansion turbine 37. The gas which is not supplied to the region 381 but is supplied to the region 377 between the bearing portion 376 and the rotating shaft 371 through the gas supply passage 378 also passes through the gas discharge passage 379 and is discharged to an outside of the expansion turbine 37.

The above embodiment has described that the gas supply passage 382 connected to the region 381 is branched from the gas supply passage 378 through which the bearing gas is supplied to the bearing portion 376, and the gas supply passage 382 then extends to the region 381. However, the present invention is not limited to this. A gas discharge passage through which the gas discharged from the region 377 between the rotating shaft 371 and the bearing portion 376 flows may be connected to the region 381.

Figure 2:
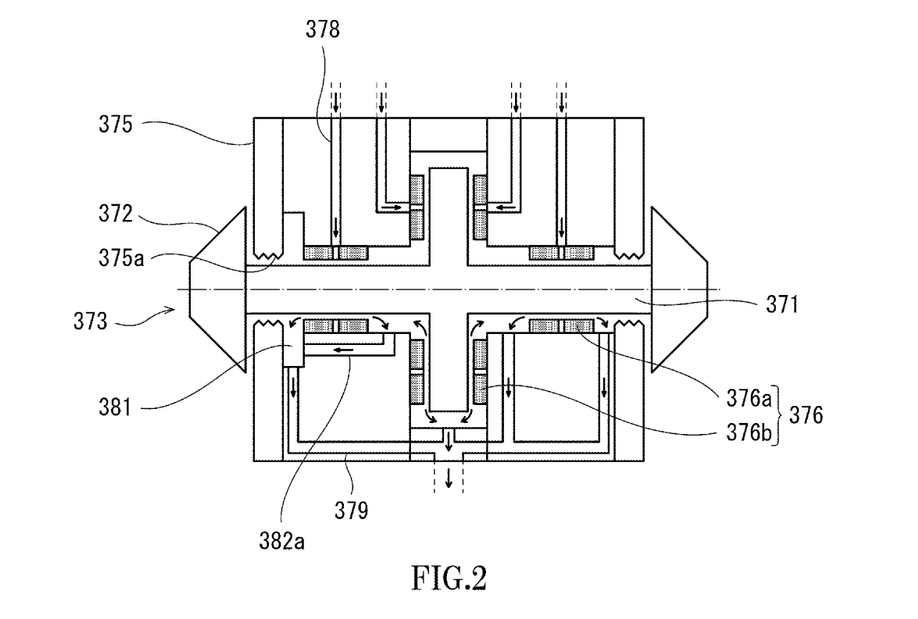
FIG. 2 is a configuration diagram showing a modified example of the expansion turbine shown in FIG. 1.

As shown in FIG. 2, a gas discharge passage through which the bearing gas discharged from the radial bearing portion 376a flows is bent and connected to the region 381. With this, a gas supply passage 382a through which the gas is supplied to the region 381 is formed. As above, the gas supply passage 382a through which the gas is supplied to the region 381 may be formed so as to be connected to the gas discharge passage through which the bearing gas is discharged from the region 377. The gas supply passage through which the gas is supplied to the region 381 is only required to be connected to any one of the gas supply passage through which the bearing gas is supplied to the region 377 between the bearing portion 376 and the rotating shaft 371 and the gas discharge passage through which the bearing gas is discharged from the region 377.

When the gas supply passage 382a through which the gas is supplied to the region 381 is connected to the gas discharge passage, the bearing gas which has been supplied to the region 377 between the rotating shaft 371 and the bearing portion 376 and used for positioning the rotating shaft 371 is used again to heat the gas in the space of the region 381. Therefore, the bearing gas for positioning the rotating shaft 371 and the gas for heating the gas in the region 381 are the same as each other. In this case, the gas is supplied to the region 377 between the rotating shaft 371 and the bearing portion 376 and is then supplied to the region 381. Since the bearing gas supplied to the region 377 between the rotating shaft 371 and the bearing portion 376 and the gas supplied to the region 381 to heat the periphery of the rotating shaft 371 and the bearing portion 376 are the same as each other, the amount of consumption of the gas can be made small.

Since the positioning of the rotating shaft 371 is performed by the pressure of the bearing gas supplied to the region 377 between the rotating shaft 371 and the bearing portion 376, the bearing gas supplied to the region 377 is required to have a certain degree of pressure. Further, since the gas supplied to the region 381 is supplied through the passage branched from the passage through which the bearing gas is supplied to the region 377, the gas supplied to the region 381 also has a certain degree of pressure.

To increase the pressure of the bearing gas supplied to the region 377, a step of pressurizing the bearing gas, such as compressing the bearing gas with a compressor, is normally required. When the pressure of the bearing gas is increased by driving the compressor, energy for driving the compressor is consumed. When the amount of consumption of the gas supplied to the region 377 increases, the amount of consumption of the energy correspondingly increases. Thus, energy efficiency of a material gas liquefier 100 as a system may deteriorate.

In contrast, when the bearing gas supplied to the region 377 and the gas supplied to the region 381 are the same as each other as in the present embodiment, the amount of consumption of the gas is made small. Therefore, the energy consumed by the material gas liquefier 100 is made low. Thus, the energy efficiency of the material gas liquefier 100 as the system can be improved.

It should be noted that in the above embodiment, the region 381 to which the gas for heating is supplied is formed at a position that communicates with the region 380 between the rotating shaft 371 and the insertion portion 375a of the cover 375. Especially, in the above embodiment, the region 381 is formed at such a position that the region 381 and the region 380 communicate with each other through the end portion 380a of the region 380, the end portion 380a being located at the second end side. However, the present invention is not limited to this, and the region 381 to which the gas for heating is supplied may be formed at another position. The region 381 may be formed at another position as long as the region 381 is a region located between the rotor member 373 and the casing member 374. To be specific, the region 381 is not required to be formed at a position close to the insertion portion 375a of the cover 375. As long as the rotating shaft 371, the bearing portion 376, or its peripheral member is heated, the region 381 to which the gas for heating is supplied may be formed at another position between the rotor member 373 and the casing member 374.

Embodiment 2

Next, the expansion turbine according to Embodiment 2 of the present invention will be described. It should be noted that the same reference signs are used for the same components as in Embodiment 1, and explanations thereof are omitted, and only the different components will be described.

Figure 3:
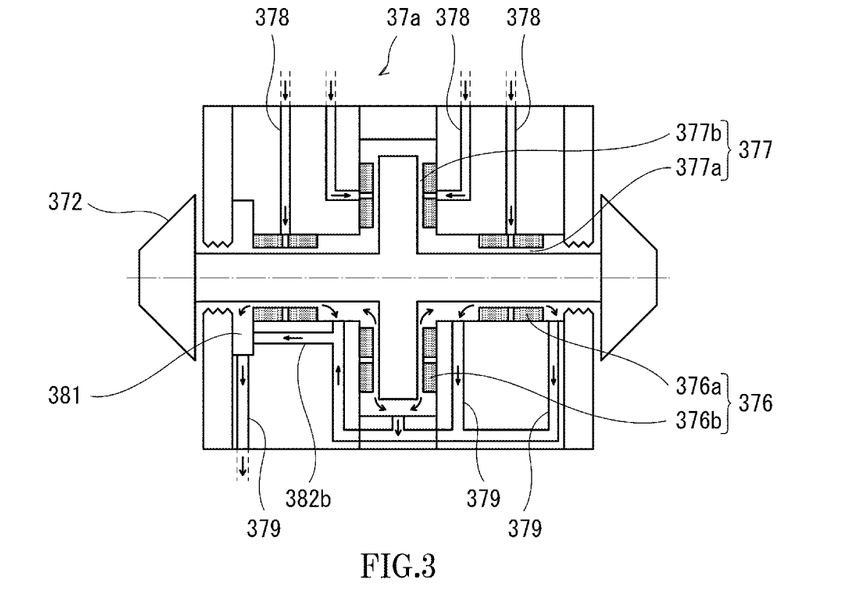
FIG. 3 is a configuration diagram showing the expansion turbine according to Embodiment 2 of the present invention.

In Embodiment 2, all of a plurality of gas discharge passages 379 through which the bearing gas supplied to the region 377 between the rotating shaft 371 and the bearing portion 376 is discharged from the region 377 are connected to the region 381.

FIG. 3 is a configuration diagram showing an expansion turbine 37a in Embodiment 2. In Embodiment 2, a plurality of bearing portions 376 are formed by the radial bearing portions 376a and the thrust bearing portions 376b. The radial bearing portions 376a are provided at the side where the impeller 372 configured to expand the process gas is attached and its opposite side that is the second end side, i.e., two radial bearing portions 376a are provided. Further, part of the rotating shaft 371 projects outward in a region sandwiched between the two radial bearing portions 376a, and two thrust bearing portions 376b supporting the part of the rotating shaft 371 in an axial direction of the rotating shaft 371 are provided so as to sandwich the rotating shaft 371 at front and rear sides in the axial direction.

A plurality of gas supply passages 378 are formed so as to respectively correspond to the plurality of bearing portions 376 such that the bearing gas is supplied to the regions 377 each between the rotating shaft 371 and the bearing portion 376.

Further, a plurality of gas discharge passages 379 are formed so as to respectively correspond to the plurality of bearing portions 376 such that the bearing gas is discharged from the regions 377 each between the rotating shaft 371 and the bearing portion 376.

In Embodiment 2, all of the plurality of gas discharge passages 379 are configured to be connected to the region 381. In the present embodiment, all of the plurality of gas discharge passages 379 are connected to each other before being connected to the region 381, and the plurality of gas discharge passages 379 are put together as a single gas passage. This gas passage is connected to the region 381. Therefore, the plurality of gas discharge passages 379 are connected to each other and configured as a single gas supply passage 382b through which the gas for heating is supplied to the region 381.

Since the gas supply passage 382b through which the gas is supplied to the region 381 is configured as above, all the gas supplied to the regions 377 each between the bearing portion 376 and the rotating shaft 371 is once supplied to the region 381. With this, the flow rate of the gas supplied to the region 381 can be adequately secured. Since the gas is supplied to the region 381 at an adequate flow rate, the decrease in temperature around the rotating shaft 371 and the bearing portion 376 can be more surely prevented. Therefore, the dimensional accuracy of members around the rotating shaft 371 and the bearing portion 376 does not deteriorate, and the amount of process gas leaking through the gap between the impeller 372 and the cover 375 is made small. On this account, the reliability of the expansion turbine 37 can be further improved.

It should be noted that the arrangement of the plurality of bearing portions 376 is not limited to the above embodiment. As long as all of the plurality of gas discharge passages 379 are configured to be connected to the region 381, the arrangement of the bearing portion 376 may be another arrangement.

Embodiment 3

Next, the expansion turbine according to Embodiment 3 of the present invention will be described. It should be noted that the same reference signs are used for the same components as in Embodiments 1 and 2, and explanations thereof are omitted, and only the different components will be described.

Figure 4:
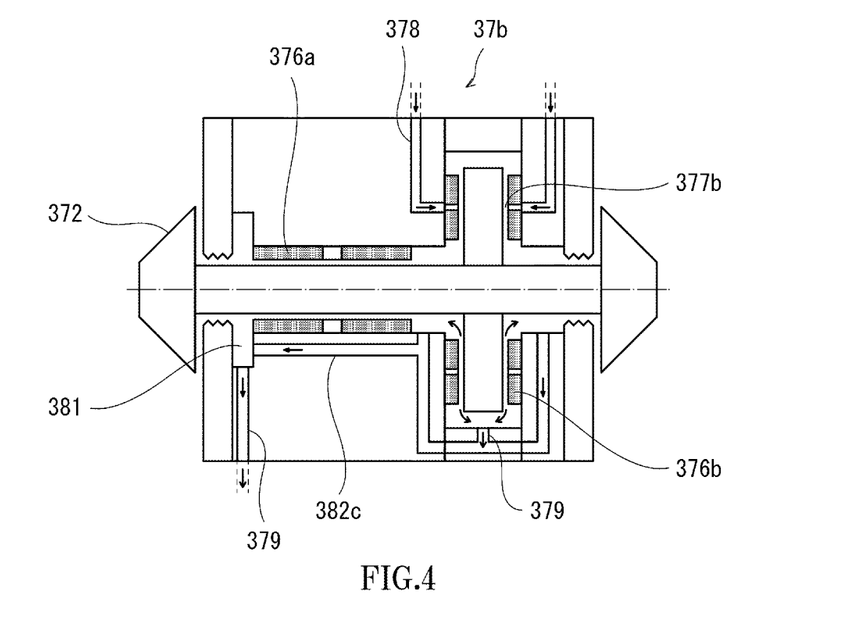
FIG. 4 is a configuration diagram showing the expansion turbine according to Embodiment 3 of the present invention.

FIG. 4 is a configuration diagram showing an expansion turbine 37b in Embodiment 3. In Embodiment 3, the gas supply passage 378 through which the gas is supplied to the region (fourth region) 377b between the rotating shaft 371 and the thrust bearing portion 376b is formed only at the thrust bearing portion 376b of the bearing portion 376. Further, the gas discharge passage 379 through which the gas is discharged from the region 377b between the rotating shaft 371 and the thrust bearing portion 376b is formed only at the thrust bearing portion 376b. A gas supply passage 382c through which the gas is supplied to the region 381 is formed so as to be connected only to the gas discharge passage 379 provided for the thrust bearing portion 376b.

Typically, while the expansion turbine is being operated, a load applied to the thrust bearing portion is larger than a load applied to the radial bearing portion. Therefore, large force is required at the thrust bearing portion to position the rotating shaft, whereas small force is enough at the radial bearing portion to position the rotating shaft. On this account, when it is unnecessary to actively supply the bearing gas to the radial bearing portion, the gas supply passage through which the bearing gas is supplied to the radial bearing portion does not have to be provided.

Regarding the radial bearing portion 376a, while the rotating shaft 371 is rotating, the noncontact state of the rotating shaft 371 with respect to the radial bearing portion 376a is maintained by the gas drawn into between the rotating shaft 371 and the radial bearing portion 376a. As above, the radial bearing portion 376a of the present embodiment is a so-called dynamic pressure bearing portion. In such a case, the gas supply passage 378 through which the bearing gas is supplied to the region 377b and the gas discharge passage 379 through which the bearing gas is discharged from the region 377b may be formed only at the thrust bearing portion 376b.

The gas discharge passage 379 through which the bearing gas is discharged from the region 377b at the thrust bearing portion 376b is connected to the gas supply passage 382c through which the gas is supplied to the region 381. Therefore, the gas supplied to the region 377b between the rotating shaft 371 and the thrust bearing portion 376b and discharged from the gas discharge passage 379 passes through the gas supply passage 382c and is then supplied to the region 381. On this account, the decrease in temperature around the rotating shaft 371 and the bearing portion 376 can be prevented. Thus, the dimensional accuracy of members around the rotating shaft 371 and the bearing portion 376 does not deteriorate, and the amount of process gas leaking through the gap between the impeller 372 and the cover 375 is made small. Therefore, the reliability of the expansion turbine 37 can be improved.

In Embodiment 3, the gas supply passage 382c is connected to the gas discharge passage 379 through which the bearing gas is discharged from the region 377b at the thrust bearing portion 376b. However, the present invention is not limited to this. The gas supply passage 382c may be configured to be connected to the gas supply passage 378 through which the bearing gas is supplied to the region 377 at the thrust bearing portion 376b.

As above, the gas supply passage 382c through which the gas is supplied to the region 381 may be formed so as to be connected only to the gas supply passage 378 for the thrust bearing portion 376b or the gas discharge passage 379 for the thrust bearing portion 376b.

In the present embodiment, between the radial bearing portion 376a and the thrust bearing portion 376b, the gas supply passage 382c is configured to be connected to the gas supply passage 378 for the thrust bearing portion 376b or the gas discharge passage 379 for the thrust bearing portion 376b. However, the present invention is not limited to this, and between the radial bearing portion 376a and the thrust bearing portion 376b, the gas supply passage 382c may be configured to be connected only to the gas supply passage 378 for the radial bearing portion 376a or the gas discharge passage 379 for the radial bearing portion 376a.

Embodiment 4

Next, the expansion turbine according to Embodiment 4 of the present invention will be described. It should be noted that the same reference signs are used for the same components as in Embodiments 1 to 3, and explanations thereof are omitted, and only the different components will be described.

Figure 5:
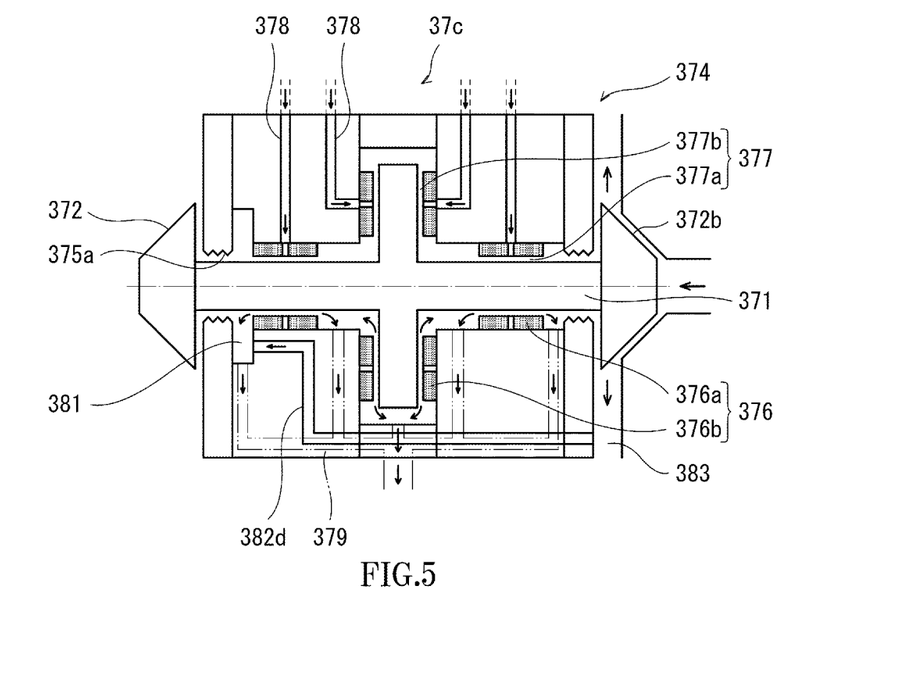
FIG. 5 is a configuration diagram showing the expansion turbine according to Embodiment 4 of the present invention.

FIG. 5 is a configuration diagram showing an expansion turbine 37c in Embodiment 4. In Embodiment 4, a brake impeller 372b is attached to an end opposite to the end to which the impeller 372 configured to expand the process gas is attached. Part of brake gas compressed by the brake impeller 372b is supplied to the region 381.

The expansion turbine 37c of Embodiment 4 will be described. In the present embodiment, the impeller 372 configured to expand the process gas is attached to the first end of the rotating shaft 371, and the brake impeller (second impeller) 372b is attached to the second end (opposite to the first end) of the rotating shaft 371.

When the rotating shaft 371 rotates, the brake impeller 372b compresses the process gas while taking therein the process gas flowing through a passage 383 located close to the brake impeller 372b. The process gas compressed by the brake impeller flows through the gas passage 383, circulates in the gas passage therefrom, and then returns to the brake impeller 372b again. Then, the returned process gas is compressed by the brake impeller 372 again. As above, compressing the process gas by the brake impeller 372b is repeatedly performed by the circulation of the process gas in the passages. With this, a brake line in which the process gas is repeatedly compressed is configured by the brake impeller 372b and the gas passage 383.

In the present embodiment, a gas supply passage (third gas supply passage) 382d through which the gas is supplied to the region 381 is connected to the gas passage 383 constituting the brake line. To be specific, the gas supply passage 382d connected to the gas passage 383 through which the process gas compressed by the brake impeller 372b flows is connected to the region 381. With this, part of the process gas flowing through the gas passage 383 of the brake line is supplied to the region 381 through the gas supply passage 382d.

In Embodiment 4, part of the bearing gas discharged from the region 377a between the rotating shaft 371 and the radial bearing portion 376a located close to the impeller 372 configured to expand the process gas is directly supplied to the region 381. In addition to the supply of the gas to the region 381 from the region 377a located close to the impeller 372, the supply of the gas from the gas passage 383 to the region 381 is also performed. Therefore, the decrease in temperature around the rotating shaft 371 and the bearing portion 376 can be more surely prevented. With this, the reliability of the expansion turbine 37 can be further improved.

The gas compressed by the brake impeller 372b flows through the gas passage 383 constituting the brake line. Therefore, the process gas having relatively high temperature and relatively high pressure flows through the gas passage 383.

Since the process gas flowing through the gas passage 383 has relatively high pressure, the process gas is supplied to the region 381 by forming the gas supply passage 382d between the gas passage 383 and the region 381. Therefore, a gas supply means for supplying the gas from the gas passage 383 to the region 381 does not have to be newly provided. On this account, the gas supply passage 382d through which the gas is supplied to the region 381 can be formed by a simple change. With this, manufacturing cost for manufacturing the expansion turbine including the gas supply passage 382d through which the gas is supplied to the region 381 can be made low.

Further, since the process gas flowing through the gas passage 383 has relatively high temperature, the region 381 can be efficiently heated by supplying the gas from the gas passage 383 through the gas supply passage 382d to the region 381.

As above, the gas supply passage 382d connected to the gas passage 383 through which the gas compressed by the brake impeller 372b flows may be connected to the region 381. With this, the gas flowing through the gas passage 383 constituting the brake line may be supplied to the region 381.

OTHER EMBODIMENTS

It should be noted that the present invention may be additionally applied to an expansion turbine configured such that a seal gas is supplied to the gap between the impeller and the cover to push back toward the impeller the process gas leaking from the gap between the impeller and the cover toward the second end side. Even in the case of an expansion turbine configured such that a seal gas is supplied to a seal gas chamber connected to the gap between the impeller and the cover, when the flow rate of the process gas steeply changes, the supply of the seal gas may not deal with the steep change of the flow rate of the process gas. To deal with such case, a configuration of supplying a gas for heating to the region between the rotor member and the casing member may be added to the expansion turbine configured such that the seal gas is supplied.

REFERENCE SIGNS LIST

371 rotating shaft
372 impeller
373 rotor member
374 casing member
376 bearing portion
378, 382 gas supply passage
379 gas discharge passage

The invention claimed is:
1. An expansion turbine comprising:
   a rotor member including
      a rotating shaft and
      a first impeller attached to a first end of the rotating shaft and configured to, when the rotating shaft rotates, expand process gas while taking the process gas in the first impeller; and
   a casing member configured to accommodate the rotor member such that the rotor member is rotatable, wherein:
   the casing member includes
      a bearing portion supporting the rotating shaft,
      a first gas supply passage through which gas is supplied to a first region between the rotating shaft and the bearing portion,
      a gas discharge passage through which the gas supplied to the first region is discharged from the first region, and
      a second gas supply passage connected to any one of the first gas supply passage and the gas discharge passage, the gas being supplied through the second gas supply passage to a second region between the rotor member and the casing member,
   a plurality of bearing portions including the bearing portion are formed,
   a plurality of first regions including the first region are formed so as to respectively correspond to the plurality of bearing portions, and gas discharge passages including the gas discharge passage are formed so as to respectively correspond to the plurality of bearing portions, and
   at least one of the gas discharge passages is connected to the second region.
2. The expansion turbine according to claim 1, wherein the gas higher in temperature than the process gas expanded by the first impeller is supplied to the second region.
3. The expansion turbine according to claim 1, wherein:
   the casing member includes a cover covering at least a back surface portion of the first impeller;
   the cover includes an insertion portion into which the rotating shaft is rotatably inserted; and the second region is a region communicating with a third region between the rotating shaft and the insertion portion.

4. The expansion turbine according to claim 3, wherein a sealing portion is provided at the insertion portion, the sealing portion being configured to prevent a leak of the process gas, taken by the first impeller, along the rotating shaft toward a second end side of the insertion portion, the second end side being opposite to a first end side corresponding to the first end.

5. An expansion turbine comprising:
a rotor member including
a rotating shaft and
a first impeller attached to a first end of the rotating shaft and configured to, when the rotating shaft rotates, expand process gas while taking the process gas in the first impeller; and
a casing member configured to accommodate the rotor member such that the rotor member is rotatable, wherein:
the casing member includes
a bearing portion supporting the rotating shaft,
a first gas supply passage through which gas is supplied to a first region between the rotating shaft and the bearing portion,
a gas discharge passage through which the gas supplied to the first region is discharged from the first region, and
a second gas supply passage connected to any one of the first gas supply passage and the gas discharge passage, the gas being supplied through the second gas supply passage to a second region between the rotor member and the casing member,
the bearing portion includes a thrust bearing portion supporting the rotating shaft in an axial direction,
the first gas supply passage is a gas passage which is connected only to the thrust bearing portion and therefore supplies the gas only to a fourth region between the rotating shaft and the thrust bearing portion, and
the gas discharge passage is a gas passage which is connected only to the thrust bearing portion and therefore discharges the gas only from the fourth region.

6. The expansion turbine according to claim 1, wherein the second gas supply passage has a bent gas supply passage that includes (a) a first portion receiving bearing gas discharged from the bearing portion and (b) a second portion connected to the first portion and extending substantially perpendicular to the first portion, the second portion supplying the bearing gas to the second region and extending substantially parallel to a longitudinal axis of the bearing portion.

* * * * *